United States Patent
Zu

(10) Patent No.: US 11,887,276 B2
(45) Date of Patent: Jan. 30, 2024

(54) IMAGE PROCESSING METHOD AND DISPLAY APPARATUS FOR ADJUSTING FORMAT AND RESOLUTION OF INPUT IMAGE IN PARALLEL AND MATRIX MANNER

(71) Applicant: BOE Technology Group Co., Ltd., Beijing (CN)

(72) Inventor: Chunshan Zu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 153 days.

(21) Appl. No.: 17/555,129

(22) Filed: Dec. 17, 2021

(65) Prior Publication Data

US 2022/0253976 A1    Aug. 11, 2022

(30) Foreign Application Priority Data

Feb. 10, 2021    (CN) .......................... 202110184941.5

(51) Int. Cl.
*G06T 3/40*    (2006.01)
*G06T 5/00*    (2006.01)
*G06T 1/20*    (2006.01)

(52) U.S. Cl.
CPC .............. *G06T 3/4046* (2013.01); *G06T 1/20* (2013.01); *G06T 5/003* (2013.01); *G06T 2207/20084* (2013.01)

(58) Field of Classification Search
None
See application file for complete search history.

(56) References Cited

U.S. PATENT DOCUMENTS

| 2011/0158606 | A1* | 6/2011 | Lin ......................... G11B 27/11 386/248 |
| 2021/0073944 | A1* | 3/2021 | Liu ........................... G06T 1/20 |
| 2021/0112261 | A1* | 4/2021 | Hwang ................ H04N 19/186 |

FOREIGN PATENT DOCUMENTS

| CN | 112333538 A | * | 2/2021 |
| EP | 4120183 A1 | * | 1/2023 |

* cited by examiner

*Primary Examiner* — Patrick F Valdez
(74) *Attorney, Agent, or Firm* — IPro, PLLC

(57) ABSTRACT

An image processing method and a display apparatus are provided. The image processing method includes: acquiring an input image and an image output specification; determining image processing information for the input image; performing image processing, in accordance with the image processing information, on a plurality of images in the input image in a parallel and matrix manner. The performing image processing on the plurality of images in the parallel and matrix manner is referred to as performing processing on the plurality of images in parallel, and processes performed on each image include a preprocessing process, an image quality enhancement process and a post-processing process.

20 Claims, 5 Drawing Sheets

IMAGE PROCESSING METHOD AND DISPLAY APPARATUS FOR ADJUSTING FORMAT AND RESOLUTION OF INPUT IMAGE IN PARALLEL AND MATRIX MANNER

CROSS-REFERENCE TO RELATED APPLICATION

This application claims a priority to Chinese Patent Application No. 202110184941.5 filed on Feb. 10, 2021, which is incorporated in its entirety by reference herein.

TECHNICAL FIELD

The present disclosure relates to the field of display technology, in particular to an image processing method and a display apparatus.

BACKGROUND

When displaying an image by using a display apparatus, an input image may be of relatively poor quality, and there may exist a certain difference between a format of the input image and an output format of the display apparatus. For instance, a resolution of the input image may different from that of the display apparatus and a definition of the input image may be different from a definition required by a user.

SUMMARY

In a first aspect, the present disclosure provides in some embodiments an image processing method, applied to a display apparatus. The image processing method includes: acquiring an input image and an image output specification, where the image output specification includes an image output quality, an image output resolution and an image output format; determining image processing information for the input image, where the image processing information includes first format adjustment information and a resolution adjustment parameter which are determined in accordance with the input image, image quality optimization information determined in accordance with the input image and the image output specification, and second format adjustment information and resolution optimization information which are determined in accordance with the image output specification; performing image processing, in accordance with the image processing information, on a plurality of images in the input image in a parallel and matrix manner, and outputting processed images according to an arrangement order of the plurality of images, where the performing image processing on the plurality of images in the parallel and matrix manner is referred to as performing processing on the plurality of images in parallel, and processes performed on each image include a preprocessing process, an image quality enhancement process and a post-processing process, where the preprocessing process is performed in accordance with the first format adjustment information and the resolution adjustment parameter, the image quality enhancement process is performed in accordance with the image quality optimization information, and the post-processing process is performed in accordance with the second format adjustment information and the resolution optimization information.

Optionally, the determining the image processing information for the input image includes: obtaining a format and a resolution of the input image; determining a decoder for converting the format of the input image into a first preset format as the first format adjustment information in response to the format of the input image not being the first preset format; and determining a standard resolution which is closest to the resolution of the input image as the resolution adjustment parameter in response to the resolution of the input image not being the standard resolution.

Optionally, the preprocessing process includes: converting the format of the input image into the first preset format by using the decoder in response to the format of the input image not being the first preset format; zooming the resolution of the input image into the standard resolution in response to the resolution of the input image not being the standard resolution.

Optionally, subsequent to acquiring the input image and the image output specification, the image processing method further includes: determining whether an image input specification and the image output specification of the input image are changed; where the image input specification includes at least a resolution and a format of the input image; performing the step of determining the image processing information for the input image in response to at least one of the image input specification and the image output specification being changed; calling existing image processing information in response to none of the image input specification and the image output specification being changed.

Optionally, prior to performing the image processing, in accordance with the image processing information, on the plurality of images in the input image in the parallel and matrix manner, the image processing method further includes: determining whether a computing resource for executing the image quality enhancement process is changed, where the computing resource includes an Neural Network Processing Unit (NPU) resource, a Graphics Processing Unit (GPU) resource and a Central Processing Unit (CPU) resource; in a case where the computing resource is changed and there exist available NPU resources and available GPU resources, taking all the available NPU resources and available GPU resources as candidate computing resources for executing the image quality enhancement process; in a case where the computing resource is changed and there exist available NPU resources but no available GPU resources, taking all the available NPU resources as candidate computing resources for executing the image quality enhancement process; in a case where the computing resource is changed and there exist available GPU resources but no available NPU resources, taking a part of the available GPU resources as candidate computing resources for executing the image quality enhancement process; in a case where the computing resource is changed and there exists no available NPU resources and no available GPU resources, taking a part of available CPU resources as candidate computing resources for executing the image quality enhancement process.

Optionally, the determining the image processing information for the input image includes: determining whether the candidate computing resources include NPU resources or GPU resources; in response to available computing resources including at least one of the NPU resources or the GPU resources, taking an image quality level corresponding to an image quality requirement set by a user as an image quality level of the image quality optimization information; in response to available computing resources not including any NPU resources and any GPU resources, determining an image quality level corresponding to an image quality requirement set by the user; in response to the image quality level being smaller than or equal to a first level threshold, taking the image quality level corresponding to the image quality requirement set by the user as an image quality level of the image quality optimization information; in response to the image quality level being larger than the first level threshold, taking an image quality level corresponding to the first level threshold as an image quality level corresponding to the image quality optimization information.

Optionally, the determining the image processing information for the input image includes: selecting a first model group, where the first model group includes a plurality of image processing models, each image processing model in the first model group is capable of processing an image whose resolution is an image resolution corresponding to the resolution adjustment parameter; selecting a second model group from the first model group, where an image quality level corresponding to image processing models in the second model group is the image quality level of the image quality optimization information; in response to the second model group including an image processing model whose output resolution is equal to the image output resolution, taking the image processing model whose output resolution is equal to the image output resolution as a target image processing model corresponding to the image quality optimization information; in response to the second model group not including any image processing model whose output resolution is equal to the image output resolution, taking an image processing model having a highest output resolution in the second model group as a target image processing model corresponding to the image quality optimization information.

Optionally, the image quality enhancement process includes: performing image quality enhancement on the input image by using the target image processing model.

Optionally, the determining the image processing information for the input image includes: in response to the output resolution of the target image processing model being equal to the image output resolution, determining a same-resolution sharpening process as the resolution optimization information, where a resolution corresponding to the same-resolution sharpening process is identical to the image output resolution; in response to the output resolution of the target image processing model being smaller than the image output resolution, determining an up-sampling process as the resolution optimization information, where a resolution of an up-sampled image is identical to the image output resolution; in response to the image output format being different from a first preset format, determining an encoder for converting a format of the input image from the first preset format to the image output format as the second format adjustment information.

Optionally, the post-processing process includes: in response to the output resolution of the target image processing model being equal to the image output resolution, performing the same-resolution sharpening process on the input image; in response to the output resolution of the target image processing model being smaller than the image output resolution, performing the up-sampling process on the input image, where the resolution of the up-sampled image is identical to the image output resolution; in response to the image output format being different from the first preset format, encoding the format of the input image into the image output format by using the encoder.

In a second aspect, the present disclosure further provides in some embodiments a device for processing image, applied to a display apparatus. The device includes an acquisition module, an image processing information generation module and a parallel processing module. The acquisition module is configured to acquire an input image and an image output specification. The image output specification includes an image output quality, an image output resolution and an image output format. The image processing information generation module is configured to determine image processing information for the input image. The image processing information includes: first format adjustment information and a resolution adjustment parameter which are determined in accordance with the input image, image quality optimization information determined in accordance with the input image and the image output specification, and second format adjustment information and resolution optimization information which are determined in accordance with the image output specification. The parallel processing module is configured to: process image processing, in accordance with the image processing information, on a plurality of images in the input image in a parallel and matrix manner, and output processed images according to an arrangement order of the plurality of images. The performing image processing on the plurality of images in the parallel and matrix manner is referred to as performing processing on the plurality of images in parallel, and processes performed on each image include a preprocessing process, an image quality enhancement process and a post-processing process. The preprocessing process is performed in accordance with the first format adjustment information and the resolution adjustment parameter. The image quality enhancement process is performed in accordance with the image quality optimization information, and the post-processing process is performed in accordance with the second format adjustment information and the resolution optimization information.

In a third aspect, the present disclosure further provides in some embodiments a display apparatus. The display apparatus includes a memory, a processor and a computer program stored in the memory and capable of being executed by the processor. The computer program is executed by the processor to implement: acquiring an input image and an image output specification, where the image output specification includes an image output quality, an image output resolution and an image output format; determining image processing information for the input image, where the image processing information includes first format adjustment information and a resolution adjustment parameter which are determined in accordance with the input image, image quality optimization information determined in accordance with the input image and the image output specification, and second format adjustment information and resolution optimization information which are determined in accordance with the image output specification; performing image processing, in accordance with the image processing information, on a plurality of images in the input image in a parallel and matrix manner, and outputting processed images according to an arrangement order of the plurality of images, where the performing image processing on the plurality of images in the parallel and matrix manner is referred to as performing processing on the plurality of images in parallel, and processes performed on each image include a preprocessing process, an image quality enhancement process and a post-processing process, where the preprocessing process is performed in accordance with the first format adjustment information and the resolution adjustment parameter, the image quality enhancement process is performed in accordance with the image quality optimization information, and the post-processing process is performed in accordance with the second format adjustment information and the resolution optimization information.

Optionally, the computer program is further executed by the processor to implement: obtaining a format and a resolution of the input image; determining a decoder for converting the format of the input image into a first preset format as the first format adjustment information, in response to the format of the input image not being the first preset format; and determining a standard resolution which is closest to the resolution of the input image as the resolution adjustment parameter, in response to the resolution of the input image not being the standard resolution.

Optionally, the preprocessing process includes: converting the format of the input image into the first preset format by using the decoder in response to the format of the input image not being the first preset format; zooming the resolution of the input image into the standard resolution in response to the resolution of the input image not being the standard resolution.

Optionally, the computer program is further executed by the processor to implement: subsequent to acquiring the input image and the image output specification, determining whether an image input specification and the image output specification of the input image are changed, where the image input specification includes at least a resolution and a format of the input image; performing the step of determining the image processing information for the input image in response to at least one of the image input specification and the image output specification being changed; calling existing image processing information in response to none of the image input specification and the image output specification being changed.

Optionally, the computer program is further executed by the processor to implement: prior to performing the image processing, in accordance with the image processing information, on the plurality of images in the input image in the parallel and matrix manner, determining whether a computing resource for executing the image quality enhancement process is changed, where the computing resource includes an Neural Network Processing Unit (NPU) resource, a Graphics Processing Unit (GPU) resource and a Central Processing Unit (CPU) resource; in a case where the computing resource is changed and there exist available NPU resources and available GPU resources, taking all the available NPU resources and available GPU resources as candidate computing resources for executing the image quality enhancement process; in a case where the computing resource is changed and there exist available NPU resources but no available GPU resources, taking all the available NPU resources as candidate computing resources for executing the image quality enhancement process; in a case where the computing resource is changed and there exist available GPU resources but no available NPU resources, taking a part of the available GPU resources as candidate computing resources for executing the image quality enhancement process; in a case where the computing resource is changed and there exists no available NPU resources and no available GPU resources, taking a part of available CPU resources as candidate computing resources for executing the image quality enhancement process.

Optionally, the computer program is further executed by the processor to implement: determining whether the candidate computing resources include NPU resources or GPU resources; in response to available computing resources including at least one of the NPU resources or the GPU resources, taking an image quality level corresponding to an image quality requirement set by a user as an image quality level of the image quality optimization information; in response to available computing resources not including any NPU resources and any GPU resources, determining an image quality level corresponding to an image quality requirement set by the user; in response to the image quality level being smaller than or equal to a first level threshold, taking the image quality level corresponding to the image quality requirement set by the user as an image quality level of the image quality optimization information; in response to the image quality level being larger than the first level threshold, taking an image quality level corresponding to the first level threshold as an image quality level corresponding to the image quality optimization information.

Optionally, the computer program is further executed by the processor to implement: selecting a first model group, where the first model group includes a plurality of image processing models, each image processing model in the first model group is capable of processing an image whose resolution is an image resolution corresponding to the resolution adjustment parameter; selecting a second model group from the first model group, where an image quality level corresponding to image processing models in the second model group is the image quality level of the image quality optimization information; in response to the second model group including an image processing model whose output resolution is equal to the image output resolution, taking the image processing model whose output resolution is equal to the image output resolution as a target image processing model corresponding to the image quality optimization information; in response to the second model group not including any image processing model whose output resolution is equal to the image output resolution, taking an image processing model having a highest output resolution in the second model group as a target image processing model corresponding to the image quality optimization information.

Optionally, the image quality enhancement process includes: performing image quality enhancement on the input image by using the target image processing model.

Optionally, the computer program is further executed by the processor to implement: in response to the output resolution of the target image processing model being equal to the image output resolution, determining a same-resolution sharpening process as the resolution optimization information, where a resolution corresponding to the same-resolution sharpening process is identical to the image output resolution; in response to the output resolution of the target image processing model being smaller than the image output resolution, determining an up-sampling process as the resolution optimization information, where a resolution of an up-sampled image is identical to the image output resolution; in response to the image output format being different from a first preset format, determining an encoder for converting a format of the input image from the first preset format to the image output format, as the second format adjustment information.

In a fourth aspect, the present disclosure provides in some embodiments a computer-readable storage medium having a computer program stored thereon. The computer program is executed by a processor to implement: acquiring an input image and an image output specification, where the image output specification includes an image output quality, an image output resolution and an image output format; determining image processing information for the input image, where the image processing information includes first format adjustment information and a resolution adjustment parameter which are determined in accordance with the input image, image quality optimization information determined in accordance with the input image and the image output specification, and second format adjustment information and resolution optimization information which are determined in accordance with the image output specification; performing image processing, in accordance with the image processing information, on a plurality of images in the input image in a parallel and matrix manner, and outputting processed images according to an arrangement order of the plurality of images, where the performing image processing on the plurality of images in the parallel and matrix manner is referred to as performing processing on the plurality of images in parallel, and processes performed on each image include a preprocessing process, an image quality enhancement process and a post-processing process, where the preprocessing process is performed in accordance with the first format adjustment information and the resolution adjustment parameter, the image quality enhancement process is performed in accordance with the image quality optimization information, and the post-processing process is performed in accordance with the second format adjustment information and the resolution optimization information.

BRIEF DESCRIPTION OF THE DRAWINGS

In order to illustrate the technical solutions of the embodiments of the present disclosure in a clearer manner, the drawings required for the description of the embodiments of the present disclosure will be described hereinafter briefly. Apparently, the following drawings merely relate to some embodiments of the present disclosure, and based on these drawings, a person of ordinary skill in the art may obtain other drawings without any creative effort.

DETAILED DESCRIPTION

Figure 1:
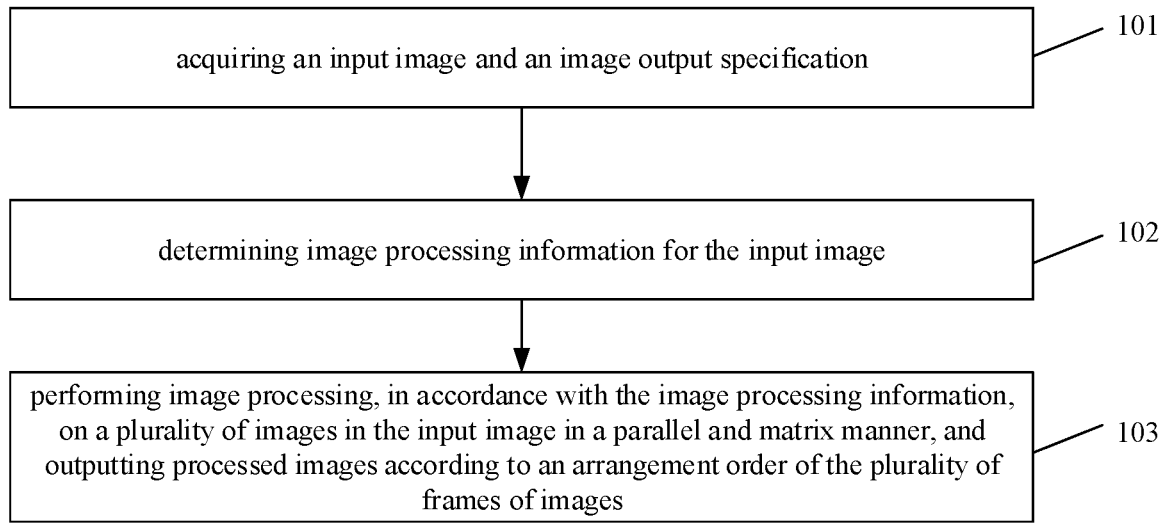
FIG. 1 is a flowchart of an image processing method according to an embodiment of the present disclosure.

The technical solutions in the embodiments of the present disclosure will be described hereinafter clearly and completely with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

An image processing method and a display apparatus are provided in the embodiments of the present disclosure, so as to improve image processing effect in an image displaying process.

In the embodiments of the present disclosure, the method for processing image is applied to the display apparatus.

According to an embodiment, the image processing method includes the following steps.

Step 101, acquiring an input image and an image output specification.

In the embodiment, after acquiring the input image, an image input specification of the input image may be further determined. The image input specification includes at least a resolution and a format of the input image.

Generally, a resolution of an image is represented in a form of multiplying the number of horizontal pixels by the number of vertical pixels, e.g., for an image with a resolution of 3840*2160, it means that the image has 3840 horizontal pixels and 2160 vertical pixels. In addition, the resolution may be represented by a common alternative description. For example, a 540p image means that a resolution of the 540p image is 960*540, a 720p image means that a resolution of the 720p image is 1280*720, a 4K image generally indicates that a resolution of the 4K image is 3840*2160, and a 8K image generally indicates that a resolution of the 8K image is 7680*4320, etc. A format of the image may be Red-Green-Blue (RGB, a color encoding mode), Luma and Chroma (YUV, another color encoding mode), or other image encoding mode.

The image output specification includes at least an image output quality, an image output resolution and an image output format.

The image output specification may be a default image output specification of the display apparatus, or may be set and inputted by a user. For instance, the user may select high definition for image play in a relatively good network environment, and may select a low-definition playing mode, which is smoother, in the case of a relatively poor network environment.

In some embodiments, the image output quality includes an image quality level.

For example, the default image output specification of the display apparatus may include that: the image quality level is a standard definition, a type of the display apparatus is 65-inch display, and a resolution of a display area is 2K.

Step 102, determining image processing information for the input image.

After the input image is determined, the image input specification of the input image is determined accordingly. Furthermore, the image output specification is determined according to requirement(s) on an output image, and parameter information in multiple processes during the processing is determined according to the image input specification and the image output specification; such step may also be called as a self-adaptive processing procedure.

Figure 3:
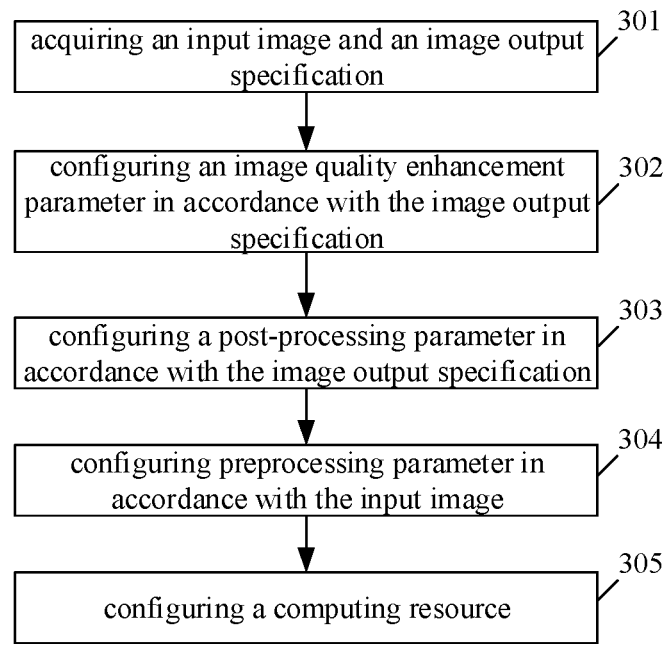
FIG. 3 is a flowchart of a self-adaptive processing procedure according to an embodiment of the present disclosure.
Figure 4:
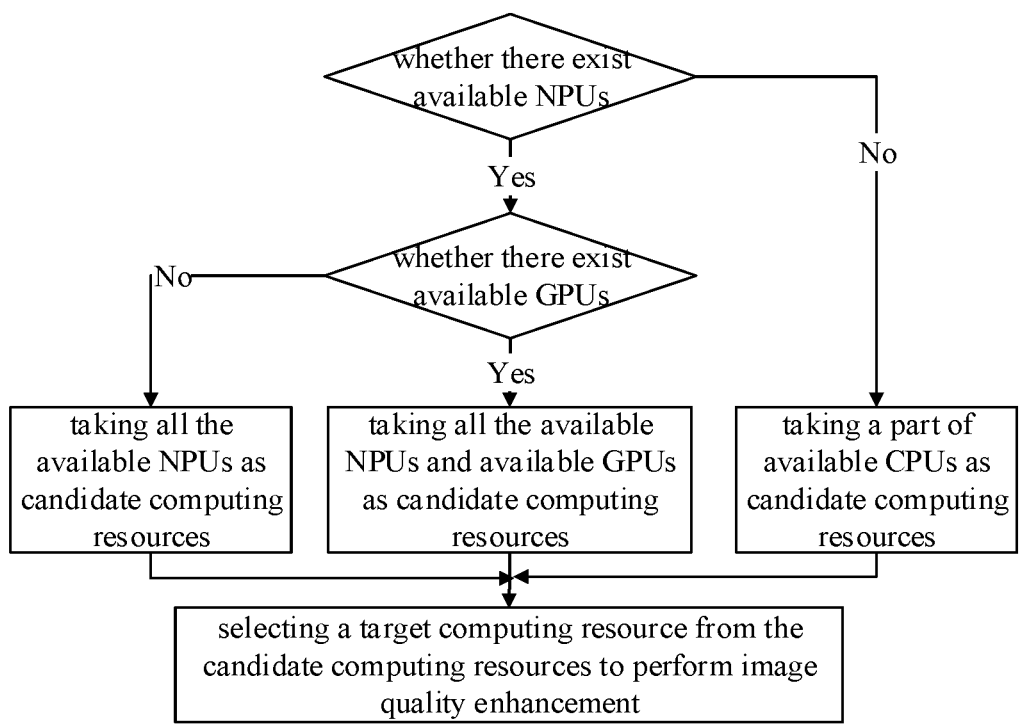
FIG. 4 is a flowchart of computing resources configuration according to an embodiment of the present disclosure.

As shown in FIG. 3, the self-adaptive processing procedure includes step 301 of acquiring an input image and an image output specification, step 302 of configuring an image quality enhancement parameter in accordance with the image output specification, step 303 of configuring a post-processing parameter in accordance with the image output specification, step 304 of configuring preprocessing parameter in accordance with the input image and step 305 of configuring a computing resource.

In the embodiment, the image processing information required to be determined specifically includes: first format adjustment information and a resolution adjustment parameter which are determined in accordance with the input image, image quality optimization information determined in accordance with the input image and the image output specification, and second format adjustment information and resolution optimization information which are determined in accordance with the image output specification.

In some embodiments, subsequent to step 101, the image processing method further includes: determining whether the image input specification of the input image and the image output specification are changed; performing the step of determining the image processing information for the input image in response to at least one of the image input specification and the image output specification being changed; calling existing image processing information in response to none of the image input specification and the image output specification being changed.

It should be appreciated that, an image inputting procedure and an outputting procedure may each be not one isolated operation. For one display apparatus, there may exist multiple times of image playing operations during usage. Input images of respective times of image playing operations may have a same format, or may have different formats. In addition, during these image playing operations, the user may adjust image output requirement(s) according to needs, for example, adjusting an image playing definition or switching a screen for displaying images, such that the image output specification is changed.

For a first time of image playing of the display apparatus, the image processing information may be determined by performing the step 102. For image playing other than the first time, it may be determined whether the image input specification and the image output specification are changed with respect to a previous image playing process.

If none of the image input specification and the image output specification are changed, the existing image processing information may be called directly, thereby simplifying a processing procedure. If any one of the image input specification and the image output specification is changed, corresponding image processing information may be further determined by performing the step 102.

Step 103, performing image processing, in accordance with the image processing information, on a plurality of images in the input image in a parallel and matrix manner, and outputting processed images according to an arrangement order of the plurality of images.

The performing image processing on the plurality of images in the parallel and matrix manner is referred to as performing processing on the plurality of images in parallel, and processes performed on each image include a preprocessing process, an image quality enhancement process and a post-processing process. The preprocessing process is performed in accordance with the first format adjustment information and the resolution adjustment parameter. The image quality enhancement process is performed in accordance with the image quality optimization information, and the post-processing process is performed in accordance with the second format adjustment information and the resolution optimization information.

In the embodiment, multiple parallel processing groups are set, to simultaneously perform parallel processing on the multiple images. The quantity of the processing groups is determined according to computing resources of the display apparatus. In this way, it is able to make full use of the computing capability of the display apparatus during image processing, and improve the speed and effect on image processing.

In some embodiments, each processing group includes one or more of a first processing unit, a second processing unit and a third processing unit. The quantity of each of the first processing unit, the second processing unit and the third processing unit in each processing group is at least one. That is, each processing group may include one or more first processing units, one or more second processing units, and one or more third processing units.

Figure 2:
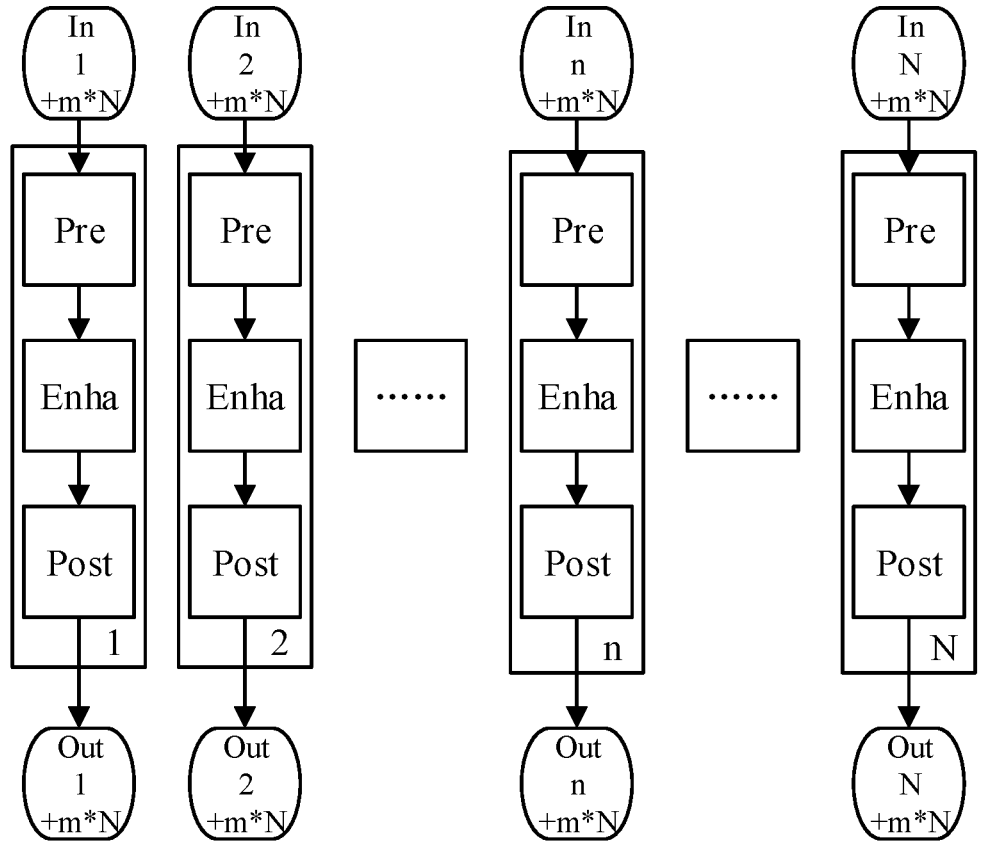
FIG. 2 is a schematic structural diagram of processing groups according to an embodiment of the present disclosure.

As shown in FIG. 2, "In" represents an input image, "Out" represents an outputted image, n represents an n-th frame of image, m represents an m-th data processing process, and N represents that N parallel processing groups have been established. Each processing group includes at least three processing units, where Pre represents the first processing unit, Enha represents the second processing unit and Post represents the third processing unit.

During operation, one frame of image may be processed by one processing group each time. In this way, N frames of images may be processed simultaneously, so it is able to realize continuous and parallel processing on video data, make full use of hardware capability and improve image processing effect.

Processes performed on each image includes the preprocessing process, the image quality enhancement process and the post-processing process. The preprocessing process is executed by the first processing unit and is performed in accordance with the first format adjustment information and the resolution adjustment information. The image quality enhancement process is executed by the second processing unit and is performed in accordance with the image quality optimization information. The post-processing process is executed by the third processing unit and is performed in accordance with the second format adjustment information and the resolution optimization information.

As shown in FIG. 2, in the embodiment, since multiple processing groups are parallel, the first processing units, the second processing units and the third processing units of different processing groups may be understood as being configured in parallel, and it is able to make full use of computing capability of hardware resources.

In an exemplary embodiment, when an image enhancement process is performed on a first frame of input image by using a second processing unit in a first processing group, a preprocessing process may be performed on a second frame of input image by using a first processing unit in a second processing group. In this way, it is able to allocate the computing capability in a balanced manner, avoid short-term computing resources shortage caused by that processes requiring many computing capability resources such as the image enhancement processes are performed simultaneously in multiple processing groups, or avoid a waste of computing resources caused by that processes requiring few computing capability resources such as the preprocessing process are performed simultaneously in multiple processing groups, thereby to improve the utilization of the computing resources.

It should be appreciated that, any processing unit in the embodiment, such as the first processing unit, the second processing unit and the third processing unit, may each be provided as plural in quantity and may be arranged in parallel. For example, two first processing units (e.g., Pre1 and Pre2) may be provided in each processing group to execute the preprocessing process. Different steps in one preprocessing process are performed by the two first processing units, that is, operation contents of the two first processing units are different. Similarly, two second processing units (such as Enha1 and Enha2) may be provided to execute the image quality enhancement process, and two third processing units (such as Post1 and Post2) may be provided to execute the post-processing process.

Through setting multiple parallel processing units, it is further able to make full use of the computing capability of the hardware resources and improve the computing speed.

After the multiple images are processed in the parallel and matrix manner, the processed images are outputted in the arrangement order of the multiple images in the input image, so as to obtain the output image.

In the embodiment of the present disclosure, the image processing information for the input image is determined in accordance with the input image and the image output specification, and the image processing is performed in accordance with the determined image processing information on the multiple images in the input image in the parallel and matrix manner. When the multiple images are processed in parallel, it is able to improve image processing efficiency. In addition, image processing processes are performed in parallel, it is able to make full use of the computing resources of the display apparatus, so as to improve the image processing effect.

In some embodiments, the self-adaptive processing procedure in step 102 includes: obtaining a format and a resolution of the input image; determining a decoder for converting the format of the input image into a first preset format as the first format adjustment information in response to the format of the input image not being the first preset format; and determining a standard resolution which is closest to the resolution of the input image as the resolution adjustment parameter in response to the resolution of the input image not being the standard resolution.

A case where the first preset format is an RGB format is taken as an example for illustration. If the input image is of the RGB format, the format of the input image is the first preset format. If the input image is of a YUV format, the format of the input image needs to be converted into the first preset format, i.e., the RGB format, in the preprocessing process. Accordingly, a decoder which is capable of converting a YUV-format image into an RGB-format image is determined as the first format adjustment information.

It should be appreciated that, images of some specific sizes are usually required for the image processing, so as to improve uniformity of image processing. Illustratively, one kind of commonly used resolution configuration includes some commonly used standard resolutions such as 540p (960*540), 720p (1280*720) and 1080p (1920*1080).

In the case that the format of the input image is one of these resolutions, it is unnecessary to adjust the resolution of the input image. The resolution adjustment parameter may be understood as an original resolution of the input image.

In the case that the format of the input image is not any of these resolutions, it is necessary to process the input image to enable the resolution of the input image to meet a requirement.

In the embodiment, the standard resolution which is closest to the resolution of the input image is determined as the resolution adjustment parameter.

For instance, if a resolution of a first image is 960*544, a standard resolution 540p (960*540) may be used as the resolution adjustment parameter. Still for instance, the resolution of the first image is 1200*700, a standard resolution 720p (1280*720) into which the resolution of the first image is converted may be used as the resolution adjustment parameter.

In some embodiments, the preprocessing process in step 103 includes: converting the format of the input image into the first preset format by using the decoder in response to the format of the input image not being the first preset format; zooming the resolution of the input image into the standard resolution in response to the resolution of the input image not being the standard resolution.

A case where the first preset format is a default RGB format of a display apparatus is taken as an example for illustration. In the case that the format of the input image is not the RGB format, the input image is decoded by using a decoder which is capable of converting a YUV-format image into an RGB-format image in accordance with the first format adjustment information, and then the input image is decoded into of the RGB format, thereby to meet subsequent processing requirements.

In the embodiment, an input image whose format is the first preset format, and an input image whose format is not the first preset format but is the first preset format after conversion are denoted as the first image.

Next, the resolution of the first image is adjusted by using the first processing unit according to needs, so as to enable the resolution of the first image to be a standard resolution. Specifically, the input image is zoomed according to a standard resolution in the resolution adjustment parameter, to make the resolution of the input image be the standard resolution.

In the embodiment, the first image whose resolution is the standard resolution or the first image whose resolution has been adjusted to the standard resolution through zooming is denoted as a second image.

In some embodiments, prior to step 103, the image processing method further includes: determining whether a computing resource for executing the image quality enhancement process is changed, where the computing resource includes an Neural Network Processing Unit (NPU) resource, a Graphics Processing Unit (GPU) resource and a Central Processing Unit (CPU) resource; in a case where the computing resource is changed and there exist available NPU resources and available GPU resources, taking all the available NPU resources and available GPU resources as candidate computing resources for executing the image quality enhancement process; in a case where the computing resource is changed and there exist available NPU resources but no available GPU resources, taking all the available NPU resources as candidate computing resources for executing the image quality enhancement process; in a case where the computing resource is changed and there exist available GPU resources but no available NPU resources, taking a part of the available GPU resources as candidate computing resources for executing the image quality enhancement process; in a case where the computing resource is changed and there exists no available NPU resources and no available GPU resources, taking a part of available CPU resources as candidate computing resources for executing the image quality enhancement process.

In the embodiment, available computing resources are further determined as candidate computing resources, and during image processing, a target computing resource is selected from the candidate computing resources and computing capability of the target computing resource is called to perform image processing.

The NPU resources refer to computing resources provided by a neural network processing unit (NPU), the GPU resources refer to computing resources provided by a graphics processing unit (GPU), and the CPU resources refer to computing resources provided by a central processing unit (CPU).

It should be appreciated that, the display apparatus generally includes a CPU and a GPU, and the display apparatus may further include an NPU. Computing capabilities of the CPU, GPU and NPU are determined by hardware structure, and are specifically determined by the quantity and types of cores included in a CPU chip, a GPU chip or an NPU chip. The CPU chip, the GPU chip or the NPU chip may each be a separate chip, or may be integrated.

The available computing resources may be affected by different factors. For example, hardware resources are shared with other applications or services, or occupied by the other applications or services, computing resources provided by the NPU are decreased because an NPU computing stick is temporarily taken out or malfunction occurs.

It should be appreciated that, in the case that the available computing resources of the display apparatus are not changed, there is no need to re-determine the candidate computing resources. Indeed, historically determined candidate computing resources are taken as current candidate computing resources based on a target running result. In the case that the available computing resources are changed, it is necessary to re-determine the candidate computing resources.

In the embodiment, when there exist available NPU resources, it means that an NPU is provided in the display apparatus and a computing capability of the NPU is not completely occupied, and it is able to provide some computing resources. When there exists no available NPU resources in the display apparatus, it means that an NPU is not provided in the display apparatus, or an NPU is provided in the display apparatus but a computing capability of the NPU is completely occupied.

When there exist available GPU resources, it means that a GPU is provided in the display apparatus and a computing capability of the GPU is not completely occupied, and it is able to provide some computing resources. When there exists no available GPU resources in the display apparatus, it means that a GPU is not provided in the display apparatus, or a GPU is provided in the display apparatus but a computing capability of the GPU is completely occupied.

Generally, a CPU is provided in the display apparatus and there exist some unoccupied CPU resources. Hence, in the embodiment, it is understood that there certainly exist available CPU resources.

For image processing, the computing capabilities provided by the NPU resource, the GPU resource and the CPU resource decrease gradually. Hence, in the embodiment, NPU resources are called preferentially as the candidate computing capability resources.

In the case of no available NPU resources, only a part of available GPU resources are taken as candidate computing capability resources, so as to avoid an influence on other functions of the display apparatus. For instance, 90% of the available GPU resources are taken as the candidate computing capability resources.

In the case of no available NPU resources and no available GPU resources, only a part of available CPU resources are taken as candidate computing capability resources, so as to avoid an influence on other operations executed by CPU. For instance, 80% of the available CPU resources are taken as the candidate computing capability resources.

In the embodiment, a proportion threshold such as 80% may be set, and corresponding GPU resources or corresponding CPU resources may be called according to the proportion threshold. Apparently, the proportion threshold may be set as 50%, 60%, 70% or the like according to needs, which will not be particularly defined herein.

In an embodiment, the display apparatus has relatively abundant computing resources, for example, 20 available NPUs. 20 NPUs may refer to 20 NPU cores, or 20 NPU chips. In the embodiment, the 20 NPUs are added into the candidate computing resources, during the image quality enhancement process, a part of the 20 NPUs, such as 10 NPUs, may be selected as target computing resources, and computing capability of the selected target computing resources is called to perform image quality enhancement.

In another embodiment, some high-priority service or process occupies 15 NPUs, so there remain 5 available NPUs. At this time, the candidate computing resources include 5 NPUs. The 5 NPUs are selected as target computing resources during image quality enhancement process and the computing capability of the selected target computing resources is called to perform image quality enhancement.

Generally, the more the quantity of the NPUs, the higher the image processing speed. In one test procedure, it consumes 30 ms when using 7 NPU cores to perform image processing on video images, and it consumes nearly 80 ms when using one NPU core to perform image processing on the same video images.

In some embodiments, the step 102 further includes: determining whether the candidate computing resources include NPU resources or GPU resources; in response to available computing resources including at least one of the NPU resources or the GPU resources, determining image quality optimization information according to an image quality requirement set by a user; in response to available computing resources not including any NPU resources and any GPU resources, determining an image quality level corresponding to an image quality requirement set by the user; in response to the image quality level being smaller than or equal to a first level threshold, taking the image quality level corresponding to the image quality requirement set by the user as an image quality level of the image quality optimization information; in response to the image quality level being larger than the first level threshold, taking an image quality level corresponding to the first level threshold as an image quality level corresponding to the image quality optimization information.

In the embodiment, the image quality level in the image quality optimization information is further determined in accordance with the available computing resources. Since it is able for the NPU resource and GPU resource to provide relatively high computing capability, in a case where the candidate computing resources include at least one of the NPU resources or the GPU resources, candidate computing capability resources may meet image processing requirements of various image quality levels. In this way, it is able to take the image quality level corresponding to the image quality requirement set by the user as the image quality level of the image quality optimization information.

In a case where the candidate computing resources include no NPU resources and no GPU resources, it is necessary to determine whether the candidate computing resources meet the image quality level corresponding to the image quality requirement set by the user. If the image quality level corresponding to the image quality requirement set by the user is too high, it is difficult for the candidate computing resources to meet the image processing requirement, so a highest image quality level which the candidate computing resources are adequate for, corresponding to the first level threshold, is taken as the image quality level of the image quality optimization information.

In the case that the image quality level corresponding to the image quality requirement set by the user is lower than the first level threshold, it means that the candidate computing resources meet the image processing requirement of the image quality level, so the image quality level corresponding to the image quality requirement set by the user is taken as the image quality level of the image quality optimization information.

Illustratively, the image quality level includes a low definition, a standard definition and a high definition. The first level threshold is the standard definition.

In a specific implementation, the candidate computing resources include the NPU resources and the GPU resources. Hence, the image quality level corresponding to the image quality optimization information is the image quality level corresponding to the image quality requirement set by the user.

In another specific implementation, the candidate computing resources do not include the NPU resources and the GPU resources. If the image quality level corresponding to the image quality requirement set by the user is the high definition, it is unable for the candidate computing resources to meet the image processing requirement. Hence, the image quality level corresponding to the image quality optimization information is set as the standard definition. If the image quality level corresponding to the image quality requirement set by the user is the low definition or the standard definition, it is able for the candidate computing resources to meet the image processing requirement, and the image quality level corresponding to the image quality requirement set by the user is taken as the image quality level of the image quality optimization information.

In some embodiments, the step 102 further includes: selecting a first model group, where the first model group includes a plurality of image processing models, each image processing model in the first model group is capable of processing an image whose resolution is an image resolution corresponding to the resolution adjustment parameter; selecting a second model group from the first model group, where an image quality level corresponding to image processing models in the second model group is the image quality level of the image quality optimization information; in response to the second model group including an image processing model whose output resolution is equal to the image output resolution, taking the image processing model whose output resolution is equal to the image output resolution as a target image processing model corresponding to the image quality optimization information; in response to the second model group not including any image processing model whose output resolution is equal to the image output resolution, taking an image processing model having a highest output resolution in the second model group as a target image processing model corresponding to the image quality optimization information.

In the embodiment, the selected first model group includes multiple image processing models configured to perform the image quality enhancement process. Each image processing model in the first model group is able to process an image whose resolution is an image resolution corresponding to the resolution adjustment parameter. It may also be understood that an input resolution of each image processing model in the first model group is equal to the resolution corresponding to the resolution adjustment parameter. In this way, each image processing model in the first model group is able to perform the image quality enhancement process on the input image.

Next, the second model group is selected from the first model group in accordance with the above-determined image quality level of the image quality optimization information. It should be appreciated that, after the image processing model performs image quality enhancement on the image, images of different levels, such as of high image quality, medium image quality or low image quality, may be generated. In the embodiment, corresponding image processing models are further selected in accordance with the determined image quality level corresponding to the image quality optimization information, so as to form the second model group.

Images of a same video may be played on a 65-inch display panel with a resolution of 4K (3840*2160), or may be played on a 110-inch display panel with a resolution of 8K (7680*4320). A size of the display panel refers to a diagonal size of the display panel, and a measurement of the size of the display panel may refer to related technologies. Different display apparatuses may differ in image formats supported by them. The user may select high definition or low definition when watching the video. The above features are the image output specification to be determined.

Illustratively, during implementation, whole image processing models include image processing models corresponding to different image input resolutions such as 540p (960*540), 720p (1280*720) and 1080p (1920*1080).

In the embodiment, when the standard resolution corresponding to the input image is 540p (960*540), image processing models corresponding to an image input resolution of 540p (960*540) are selected as the first model group. In the case that the image quality level corresponding to the determined image quality optimization information is high-definition, which is also called as high-level, image processing models whose output image quality levels are high-level are selected from the first model group as the second model group.

In the end, the target image processing model is determined from the second model group to serve as the image quality optimization information.

All image processing models in the second model group have the input resolution of 540p (960*540) is able to output images whose image quality levels are high-level, and have different output resolutions.

In an embodiment, the image output resolution of the image output specification is 4K and the second model group includes a 4K processing model whose output resolution is 4K, and then the 4K processing model is taken as the target image processing model.

In another embodiment, the image output resolution of the image output specification is 8K. Since an 8K processing model needs to consume too many computing resources, it is difficult for the computing resources of the display apparatus to meet requirements for using the 8K processing model. Hence, provided image processing models do not include the 8K processing model. A highest image resolution which the image processing models in the second model group are adequate for is 4K; at this time, an image processing model which is capable of outputting the highest resolution, i.e., a 4K processing model, is taken as the target image processing model.

In some embodiments, the image quality enhancement process includes: performing image quality enhancement on the input image by using the target image processing model.

After the target image processing model is determined, when performing processing on the images in the parallel and matrix manner, the determined target image processing model is used to perform image quality enhancement. An image processing model corresponding to the image quality level may be a neural network model. An image processing model corresponding to a relatively low image quality level may be a conventional image quality enhancement algorithm which is of relatively low requirements on the computing resources.

In some embodiments, the step 102 includes: in response to the output resolution of the target image processing model being equal to the image output resolution, determining a same-resolution sharpening process as resolution optimization information, where a resolution corresponding to the same-resolution sharpening process is identical to the image output resolution; in response to the output resolution of the target image processing model being smaller than the image output resolution, determining an up-sampling process as the resolution optimization information, where a resolution of an up-sampled image is identical to the image output resolution; in response to the image output format being different from the first preset format, determining an encoder for converting a format of the input image from the first preset format to the image output format as the second format adjustment information.

In the embodiment, in the case that the output resolution of the target image processing model is equal to the image output resolution, the same-resolution sharpening process is taken as the resolution optimization information. The same-resolution sharpening process refers to perform a sharpening process on an image, where a resolution of the image after the sharpening process is the same as that before the sharpening process.

In the case that the output resolution of the target image processing model is different from the image output resolution, the up-sampling process is determined as the resolution optimization information, to improve the resolution of an outputted image. The resolution of an up-sampled image is increased to the required image output resolution.

In the case that a format required by the output image specification on the output image is the same as the first preset format which is specifically the RGB-format in the embodiment, there is no need to convert the format of the image.

In the case that a format required by the output image specification on the output image such as the YUV-format is not the first preset format, a corresponding encoder for converting the RGB-format into the YUV-format needs to be determined as the second format adjustment information.

In some embodiments, the post-processing process includes: in response to the output resolution of the target image processing model being equal to the image output resolution, performing the same-resolution sharpening process on the input image; in response to the output resolution of the target image processing model being smaller than the image output resolution, performing the up-sampling process on the input image, where the resolution of the up-sampled image is identical to the image output resolution; in response to the image output format being different from the first preset format, encoding the format of the input image into the image output format by using the encoder.

In the post-processing process, the image is processed by using the determined resolution optimization information and the second format adjustment information to obtain the output image meeting requirements.

Figure 5:
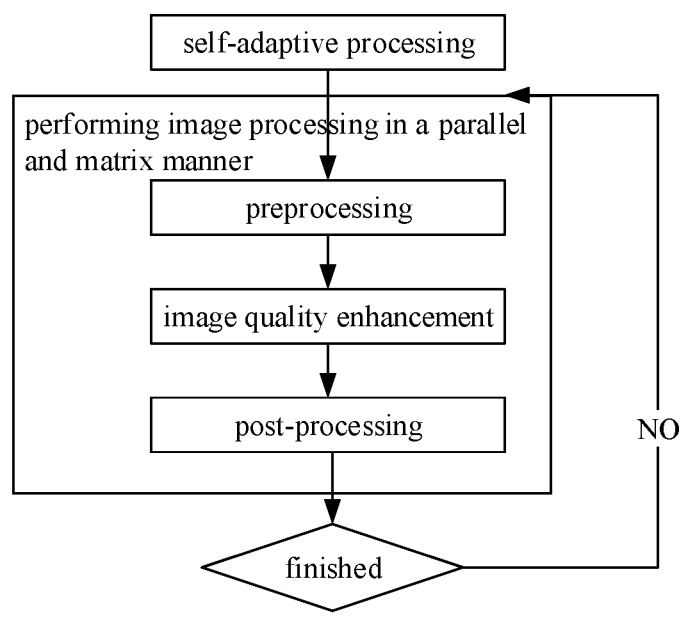
FIG. 5 is another flowchart of the image processing method according to an embodiment of the present disclosure.

As shown in FIG. 5, the technical solution in the embodiment may be summarized as follows. During image processing, self-adaptive processing is performed based on the image input specification and the image output specification of the input image, and then the preprocessing process, the image quality enhancement process and the post-processing process are performed on the input image. The preprocessing process, the image quality enhancement process and the post-processing process may refer to the foregoing embodiments. The performing processing on the images in the parallel and matrix manner in FIG. 5 refers to establishing multiple parallel processing groups and performing the preprocessing process, the image quality enhancement process and the post-processing process on multiple images in parallel.

Figure 6:
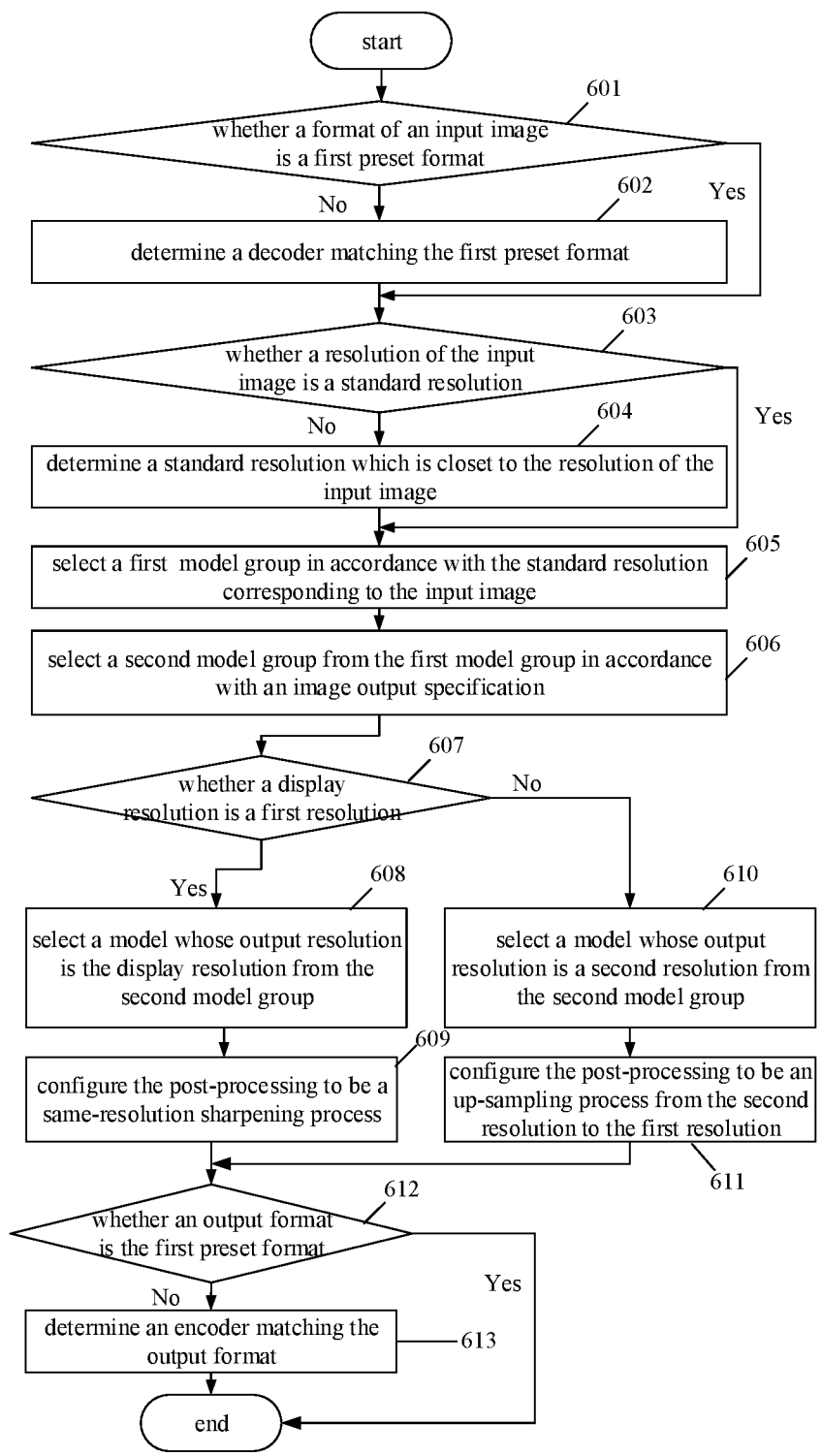
FIG. 6 is another flowchart of the self-adaptive processing procedure according to an embodiment of the present disclosure.

As shown in FIG. 6, in the embodiment, the self-adaptive processing procedure on each image is used to obtain configuration parameters for the preprocessing process, the image quality enhancement process and the post-processing process.

Obtaining the configuration parameters for the preprocessing process includes determining the decoder and the resolution adjustment parameter.

Specifically, the format of the input image is determined first according to needs, and it is determined that whether the format of the input image is the first preset format (step 601). A case where the first preset format is the RGB-format is taken as an example for illustration. If the input image is of the RGB-format, the format of the input image is the first preset format. If the format of the input image is the YUV-format, the format of the input image needs to be converted into the first preset format, i.e., RGB-format, in the preprocessing process. Correspondingly, the first format adjustment information is determined to be the decoder for converting the format from YUV to RGB (step 602).

Obtaining the configuration parameters for the preprocessing process further includes obtaining the resolution adjustment parameter. Specifically, first it is determined whether the resolution of the first image is a standard resolution (step 603). The standard resolution refers to such a general resolution as 540p (960*540), 720p (1280*720) and 1080p (1920*1080).

In the case that the resolution of the first image is any one of the standard resolutions, it is unnecessary to adjust the resolution of the first image. In the case that the resolution of the first image is not any one of the standard resolutions, it is necessary to adjust the resolution of the first image. A case where the resolution of the input image is 1280*700 is taken as an example for illustration. The resolution is not any one of the standard resolutions, the resolution of the input image needs to be converted in the preprocessing process. Specifically, the resolution of the input image may be adjusted, through such an operation as zooming, into a closest standard resolution (step 604). In the embodiment, the determined resolution adjustment parameter is the standard resolution closest to 1280*700, that is, 720 p (1280*720) is determined as the resolution adjustment parameter.

After the resolution adjustment parameter is determined, the image quality optimization information corresponding to the image quality enhancement process is determined.

Specifically, a first model group which matches the resolution is selected in accordance with the determined resolution adjustment parameter (step 605). The first model group includes multiple image processing models. Each image processing model includes at least a corresponding input resolution, a corresponding image quality level and a corresponding output resolution. Each image processing model only processes images of a corresponding resolution, and only outputs images having the corresponding image quality level and the corresponding output resolution.

Next, step 606 of selecting a second model group from the first model group in accordance with an image output specification is performed. For example, in accordance with a definition requirement in the image output specification, image processing models which is capable of outputting the corresponding image quality level are selected from the first model group, to form the second model group.

Next, a requirement by the image output specification on a resolution of the output image is determined. A case where the requirement by the image output specification on the resolution of the output image is a first resolution is taken as an example for illustration. Step 607 of determining whether a display resolution of the image output specification is the first resolution is performed.

If there exists, in the second model group, an image processing model which is capable of outputting images of the first resolution, the image processing model is selected as the target image processing model used in the image quality enhancement process (step 608). Further, the post-processing process is configured to be a same-resolution sharpening process (step 609), so as to improve the display effect of the outputted In some cases, the requirement by the image output specification on the resolution of the output image exceeds a range of output resolutions of the image processing models in the model group. For example, the first resolution is 8K, a highest resolution which the image processing models in the model group are adequate for is 4K; at this time, an image processing model which is capable of outputting the highest resolution is selected (i.e., step 610 of selecting a model whose output resolution is a second resolution from the second model group is performed). In the embodiment, specifically, a 4K processing model is selected as the target image processing model to be used in the image quality enhancement process. Further, the post-processing process is configured to be an up-sampling process from 4K to 8K (i.e., step 611 of configuring the post-processing to be an up-sampling process from the second resolution to the first resolution is performed), thereby improving the resolution of the output image and enhancing the display effect.

Configuration parameters for the post-processing process further include the encoder. Step 612 of determining whether an output format is the first preset format is performed.

In the case where the requirement on the format of the output image by the image output specification is the same as the first preset format, i.e., the RGB-format in the embodiment, there is no need to convert the format of the image.

In the case where the requirement on the format of the output image by the image output specification is not the first preset format, e.g., which may be the YUV-format, the encoder for converting the RGB-format into the YUV-format needs to be selected to encode the image (step 613), thereby meeting the usage requirements.

A device for processing image is provided according to the embodiments of the present disclosure. The device is applied to a display apparatus.

Figure 7:
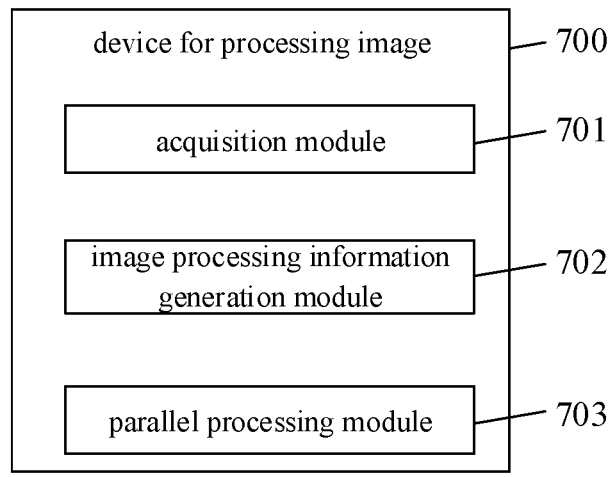
FIG. 7 is a structural diagram of a device for processing image according to an embodiment of the present disclosure.

As shown in FIG. 7, in an embodiment, the device 700 for processing image includes: an acquisition module 701, an image processing information generation module 702 and a parallel processing module 703.

The acquisition module 701 is configured to acquire an input image and an image output specification. The image output specification includes an image output quality, an image output resolution and an image output format.

The image processing information generation module 702 is configured to determine image processing information for the input image. The image processing information includes: first format adjustment information and a resolution adjustment parameter which are determined in accordance with the input image, image quality optimization information determined in accordance with the input image and the image output specification, and second format adjustment information and resolution optimization information which are determined in accordance with the image output specification.

The parallel processing module 703 is configured to: perform image processing, in accordance with the image processing information, on a plurality of images in the input image in a parallel and matrix manner, and output processed images according to an arrangement order of the plurality of images. The performing image processing on the plurality of images in the parallel and matrix manner is referred to as performing processing on the plurality of images in parallel, and processes performed on each image include a preprocessing process, an image quality enhancement process and a post-processing process. The preprocessing process is performed in accordance with the first format adjustment information and the resolution adjustment parameter. The image quality enhancement process is performed in accordance with the image quality optimization information, and the post-processing process is performed in accordance with the second format adjustment information and the resolution optimization information.

In some embodiments, the image processing information generation module 702 includes an acquisition sub-module, a first format adjustment information determination sub-module, and a resolution adjustment parameter determination sub-module.

The acquisition sub-module is configured to acquire a format and a resolution of the input image.

The first format adjustment information determination sub-module is configured to determine a decoder for converting the format of the input image into a first preset format as the first format adjustment information, in response to the format of the input image not being the first preset format.

The resolution adjustment parameter determination sub-module is configured to determine a standard resolution which is closest to the resolution of the input image as the resolution adjustment parameter, in response to the resolution of the input image not being the standard resolution.

In some embodiments, the preprocessing process includes: converting the format of the input image into the first preset format by using the decoder in response to the format of the input image not being the first preset format; zooming the resolution of the input image into the standard resolution in response to the resolution of the input image not being the standard resolution.

In some embodiments, the device further includes a first determination module and a calling module.

The first determination module is configured to determine whether an image input specification and the image output specification of the input image are changed; where the image input specification includes at least a resolution and a format of the input image.

The image processing information generation module 702 is further configured to determine the image processing information for the input image in response to at least one of the image input specification and the image output specification being changed.

The calling module is configured to call existing image processing information in response to none of the image input specification and the image output specification being changed.

In some embodiments, the device further includes a second determination module and a candidate computing resources determination module.

The second determination module is configured to determine whether a computing resource for executing the image quality enhancement process is changed, where the computing resource includes a Neural Network Processing Unit (NPU) resource, a Graphics Processing Unit (GPU) resource and a Central Processing Unit (CPU) resource.

The candidate computing resources determination module is configured to, in a case where the computing resource is changed and there exist available NPU resources and available GPU resources, take all the available NPU resources and available GPU resources as candidate computing resources for executing the image quality enhancement process.

The candidate computing resources determination module is further configured to, in a case where the computing resource is changed and there exist available NPU resources but no available GPU resources, take all the available NPU resources as candidate computing resources for executing the image quality enhancement process.

The candidate computing resources determination module is further configured to, in a case where the computing resource is changed and there exist available GPU resources but no available NPU resources, take a part of the available GPU resources as candidate computing resources for executing the image quality enhancement process.

The candidate computing resources determination module is further configured to, in a case where the computing resource is changed and there exists no available NPU resources and no available GPU resources, take a part of available CPU resources as candidate computing resources for executing the image quality enhancement process.

In some embodiments, the image processing information generation module 702 includes a computing resources determination sub-module and an image quality information determination sub-module.

The computing resources determination sub-module is configured to determine whether the candidate computing resources include NPU resources or GPU resources; and The image quality information determination sub-module is configured to, in response to available computing resources including at least one of the NPU resources or the GPU resources, determine an image quality level corresponding to an image quality requirement set by a user as an image quality level of the image quality optimization information.

The image quality information determination sub-module is further configured to, in response to available computing resources not including any NPU resources and any GPU resources, determine an image quality level corresponding to an image quality requirement set by the user.

The image quality information determination sub-module is further configured to, in response to the image quality level being smaller than or equal to a first level threshold, take the image quality level corresponding to the image quality requirement set by the user as an image quality level of the image quality optimization information.

The image quality information determination sub-module is further configured to, in response to the image quality level being larger than the first level threshold, take an image quality level corresponding to the first level threshold as an image quality level corresponding to the image quality optimization information.

In some embodiments, the image processing information generation module 702 includes a first selection sub-module, a second selection sub-module and a target image processing model determination sub-module.

The first selection sub-module is configured to select a first model group, where the first model group includes a plurality of image processing models, each image processing model in the first model group is capable of processing an image whose resolution is an image resolution corresponding to the resolution adjustment parameter.

The second selection sub-module is configured to select a second model group from the first model group, where an image quality level corresponding to image processing models in the second model group is the image quality level of the image quality optimization information The target image processing model determination sub-module is configured to, in response to the second model group including an image processing model whose output resolution is equal to the image output resolution, take the image processing model whose output resolution is equal to the image output resolution as a target image processing model corresponding to the image quality optimization information.

The target image processing model determination sub-module is further configured to, in response to the second model group not including any image processing model whose output resolution is equal to the image output resolution, take an image processing model having a highest output resolution in the second model group as a target image processing model corresponding to the image quality optimization information.

In some embodiments, the parallel processing module 703 is configured to perform image quality enhancement on the input image by using the target image processing model.

In some embodiments, the image processing information generation module 702 includes a resolution optimization information determination sub-module and a second format adjustment information determination sub-module.

The resolution optimization information determination sub-module is configured to, in response to the output resolution of the target image processing model being equal to the image output resolution, determine a same-resolution sharpening process as resolution optimization information, where a resolution corresponding to the same-resolution sharpening process is identical to the image output resolution;

The resolution optimization information determination sub-module is further configured to, in response to the output resolution of the target image processing model being smaller than the image output resolution, determine an up-sampling process as the resolution optimization information, where a resolution of an up-sampled image is identical to the image output resolution.

The second format adjustment information determination sub-module is configured to, in response to the image output format being different from a first preset format, determine an encoder for converting a format of the input image from the first preset format to the image output format as the second format adjustment information.

In some embodiments, the parallel processing module 703 includes a post-processing sub-module.

The post-processing sub-module is specifically configured to: in response to the output resolution of the target image processing model being equal to the image output resolution, perform the same-resolution sharpening process on the input image; in response to the output resolution of the target image processing model being smaller than the image output resolution, perform the up-sampling process on the input image; in response to the image output format being different from the first preset format, encode the format of the input image into the image output format by using the encoder.

The device for processing image in the embodiments may perform various steps of the image processing method according to the foregoing embodiments and may realize the same or similar technical effects, and in order to avoid repetition, the description thereof will not be repeated herein.

Figure 8:
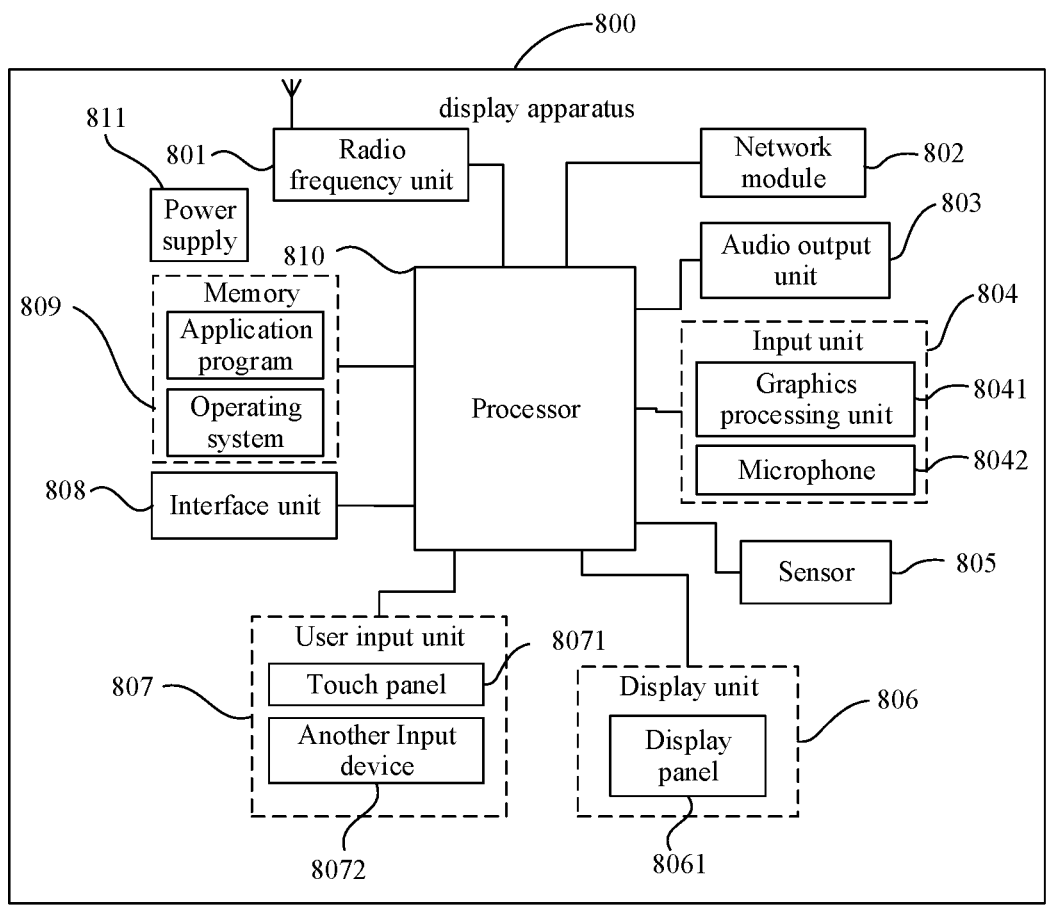
FIG. 8 is a structural diagram of a display apparatus according to an embodiment of the present disclosure.

FIG. 8 is a schematic diagram of a hardware structure of a display apparatus 800 according to the embodiments of the present disclosure.

The display apparatus includes, but is not limited to, such components as a radio frequency unit 801, a network module 802, an audio outputting unit 803, an input unit 804, a sensor 805, a display unit 806, a user input unit 807, an interface unit 808, a memory 809, a processor 810, a power supply 711 and so on. As can be appreciated by the skilled in the art that the structure of the display apparatus shown in FIG. 8 does not constitute a limitation to the display apparatus. The display apparatus may include more or fewer components than those shown in the figure, or some components may be combined, or there may be a different component layout. In some embodiments of the present disclosure, the display apparatus includes, but is not limited to, a cellphone, a tablet computer, a notebook computer, a palmtop computer, a desktop computer, a vehicle-mounted terminal, a wearable device and so on.

It should be appreciated that, in some embodiments of the present disclosure, the radio frequency unit 801 may be configured to transmit and receive information, or receive or transmit signals during communication. Usually, the radio frequency unit 801 includes, but is not limited to, an antenna, at least one amplifier, a transceiver, a coupler, a low-noise amplifier, a duplexer, etc.

The display apparatus provides a user with access to wireless broadband Internet via the network module 802, for example, helps the user to receive or send an email, browse a web page, access streaming media and the like.

The audio output unit 803 may convert audio data into an audio signal and output the audio signal into sound, where the audio data is received by the radio frequency unit 801 or the network module 802 or is stored in the memory 809. In addition, the audio output unit 803 may provide audio output (for example, a call signal reception tone or a message reception tone) related to a specific function performed by the display apparatus 800. The audio outputting unit 803 includes a loudspeaker, a buzzer, a phone receiver and so on.

The input unit 804 is configured to receive an audio signal or a video signal. The input unit 804 may include a Graphics Processing Unit (GPU) 8041 and a microphone 8042. The GPU 8041 processes image data of a static photo or a video acquired by an image capturing device (such as a camera) in video capturing mode or image capturing mode. Image frames after processing may be displayed on the display unit 806. Images frames processed by the GPU 041 may be stored in the memory 809 (or another storage medium), or may be sent by the radio frequency unit 801 or the network module 802. The microphone 8042 may receive sound and may process such sound into audio data. In a phone call mode, processed audio data may be converted, for output, into a format for transmission by the radio frequency unit 701 to a mobile communications base station.

The display apparatus 800 further includes at least one sensor 805, such as an optical sensor, a motion sensor or another sensor. Specifically, the optical sensor includes an ambient light sensor and a proximity sensor. The ambient light sensor may adjust the brightness of a display panel 8061 according to the intensity of ambient light. When the terminal 700 moves near an ear, the proximity sensor may disable the display panel 7061 and/or backlight. As a motion sensor, an accelerometer sensor may detect values of accelerations in various directions (there are usually three axes), may detect a value and a direction of gravity when the display apparatus is still, and may be configured to recognize a posture of the display apparatus (such as landscape/portrait mode switching, a related game, magnetometer posture calibration), provide a function related to vibration recognition (such as pedometer or a keystroke), etc. The sensor 805 may further include a fingerprint sensor, a pressure sensor, an iris sensor, a molecular sensor, a gyroscope, a barometer, a hygrometer, a thermometer, an infrared sensor and so on, which will not be particularly defined herein.

The display unit 806 is configured to display information inputted by a user or information provided to the user. The display unit 806 may include the display panel 8061. Optionally, the display panel 7061 may be configured in a form of a liquid crystal display (Liquid Crystal Display, LCD), an organic light-emitting diode (Organic Light-Emitting Diode, OLED), or the like.

The user inputting unit 807 may be configured to receive inputted numerical or character information, and may generate a key signal input related to user configuration and function control of the display apparatus. Specifically, the user inputting unit 807 includes a touch panel 8071 and another input device 8072. The touch panel 8071, also called as a touch screen, may collect touch operations on or near the touch panel 8071 (such as operations performed by a user on or near the touch panel 8071 by using any appropriate object or accessory such as a finger or a stylus). The touch panel 8071 may include a touch detection device and a touch controller. The touch detection device detects a touch orientation of the user, detects a signal brought by the touch operation, and transmits the signal to the touch controller. The touch controller receives touch information from the touch detection device, converts the touch information into contact coordinates, and sends the contact coordinates to the processor 810 and receives a command from the processor and executes the command. In addition, the touch panel 8071 may be implemented in various types such as a resistive type, a capacitive type, an infrared ray, and a surface acoustic wave. In addition to the touch panel 8071, the user input unit 807 may further include another input device 8072. Specifically, the another input device 8072 may include, but are not limited to, a physical keyboard, a function key (such as a volume control key, an on-off key), a trackball, a mouse, and a joystick, which will not be particularly defined herein.

Further, the touch panel 8071 may be overlaid on the display panel 8061. After detecting a touch operation on or near the touch panel, the touch panel 8071 transmits the touch operation to the processor 810 to determine a type of a touch event. Then, the processor 810 provides a corresponding visual output on the display panel 8061 according to the type of the touch event. In FIG. 8, the touch panel 8071 and the display panel 8061 serve as two separate components to implement the input and output functions of the display apparatus. However, in some embodiments, the touch panel 8071 and the display panel 8061 may be integrated to implement the input and output functions of the display apparatus, which will not be particularly defined herein.

The interface unit 808 is an interface through which an external device is connected to the display apparatus 800. For example, the external device may include a wired or wireless headset port, an external power supply (or battery charger) port, a wired or wireless data port, a memory card port, a port for connecting a device having an identification module, an audio input/output (I/O) port, a video I/O port, a headset port, and the like. The interface unit 808 may be configured to receive input (e.g., data information, electric power, etc.) from the external device and transmit the received input to one or more elements within the display apparatus 800 or may be configured to transmit data between the display apparatus 800 and the external device.

The memory 809 may be configured to store software programs and various types of data. The memory 809 may mainly include a program storage area and a data storage area. The program storage area may store an operating system, an application program required by at least one function (such as a sound play function, an image play function), and the like. The data storage area may store data (such as audio data, a phone book) created according to usage of the display apparatus. In addition, the memory 1709 may include a high speed random access memory, and may also include a non-volatile memory, such as at least one magnetic disk storage device, a flash memory device, or another volatile solid state storage device.

The processor 810 is a control center of the display apparatus, connects various parts of the entire display apparatus by various interfaces and lines, executes various functions and data processing of the display apparatus by running or executing software programs and/or modules stored in the memory 809 and invoking data stored in the memory 809, thereby performing overall monitoring of the display apparatus. The processor 810 may include one or more processing units. Optionally, the processor 810 may integrate an application processor and a modem processor. The application processor primarily processes the operating system, the user interface and the application program. The modem processor mainly processes wireless communications. It should be appreciated that the modem processor may be alternatively not integrated into the processor 810. Optionally, the processor 810 may be a central processing unit (CPU).

The display apparatus 800 may further include a power supply 811 (such as a battery) that supplies power to the various components. Optionally, the power supply 811 may be logically connected to the processor 810 through a power management system to perform functions such as charging management, discharging management and power consumption management through the power management system.

In addition, the display apparatus 800 includes some functional modules not shown, which will not be particularly defined herein.

Optionally, a display apparatus is further provided in some embodiments of the present disclosure, including a processor 810, a memory 809 and a computer program stored in the memory 809 and capable of being executed by the processor 810. The computer program is executed by the processor 810 to implement various processes of the image processing method according to the foregoing embodiments of the present disclosure, and may realize the same or similar technical effects, which will not be particularly defined herein.

A computer readable storage medium having a computer program stored thereon is further provided in an embodiment of the present disclosure. The computer program is executed by a processor to implement various processes of the embodiments of the above image processing method, and may realize the same technical effects, and in order to avoid repetition, the description thereof will not be repeated herein. The computer-readable storage medium includes, for example, a Read-Only Memory (ROM), a Random Access Memory (RAM), a magnetic disk, or an optical disk.

The above image processing method disclosed in the present disclosure may be applied to or implemented by a processor. The processor may be an integrated circuit chip having signal processing capabilities. In the implementation process, various steps of the above image processing method may be performed by an integrated logic circuit in a form of hardware or instructions in a form of software in the processor. The above processor may be a general-purpose processor, a digital signal processor (DSP), an application specific integrated circuit (ASIC), a field programmable gate array (FPGA) or other programmable logic devices, a discrete gate or transistor logic device, or a discrete hardware component. Various methods, steps, and logical blocks disclosed in the present disclosure may be implemented or performed. The genera-purpose processor may be a microprocessor, any conventional processor or the like. The steps of the image processing method disclosed in the present disclosure may be performed directly by a hardware decoding processor or by a combination of hardware and software modules in the hardware decoding processor. The software module may be located in a storage medium, such as a random access memory, a flash memory, a read-only memory, a programmable read-only memory, an electrically erasable programmable memory, or a register, which is well known in the art. The storage medium is located in a memory, the processor reads the information in the memory and performs the steps of the above image processing method in combination with the hardware thereof.

It should be appreciated that the embodiments described herein may be implemented in a form of hardware, software, firmware, middleware, microcode, or a combination thereof. For a hardware implementation, processing elements may be implemented on one or more application specific integrated circuits (ASICs), digital signal processings (DSPs), DSP devices (DSPDs), programmable logic devices (PLDs), field-programmable gate arrays (FPGAs), general-purpose processors, controllers, microcontrollers, microprocessors, other electronic elements for performing the functions of the present disclosure, or a combination thereof.

For a software implementation, the technology of the present disclosure may be implemented by operating functional modules (e.g. processes, functions) of the present disclosure. Software codes may be stored in a memory and executed by a processor. The memory may be implemented in the processor or outside the processor.

The above are merely specific embodiments of the present disclosure, but a protection scope of the present disclosure is not limited thereto. Any modifications or replacements that would easily occurred to a person skilled in the art, without departing from the technical scope disclosed in the disclosure, should be encompassed in the protection scope of the present disclosure. Therefore, the protection scope of the present disclosure shall be subject to the protection scope of the claims.

What is claimed is:

1. An image processing method, applied to a display apparatus, comprising:
acquiring an input image and an image output specification, wherein the image output specification comprises an image output quality, an image output resolution and an image output format;
determining image processing information for the input image, wherein the image processing information comprises first format adjustment information and a resolution adjustment parameter which are determined in accordance with the input image, image quality optimization information determined in accordance with the input image and the image output specification, and second format adjustment information and resolution optimization information which are determined in accordance with the image output specification;

performing image processing, in accordance with the image processing information, on a plurality of images in the input image in a parallel and matrix manner, and outputting processed images according to an arrangement order of the plurality of images, wherein the performing image processing on the plurality of images in the parallel and matrix manner is referred to as performing processing on the plurality of images in parallel, and processes performed on each image comprise a preprocessing process, an image quality enhancement process and a post-processing process, wherein the preprocessing process is performed in accordance with the first format adjustment information and the resolution adjustment parameter, the image quality enhancement process is performed in accordance with the image quality optimization information, and the post-processing process is performed in accordance with the second format adjustment information and the resolution optimization information;

wherein subsequent to acquiring the input image and the image output specification, the image processing method further comprises:

determining whether an image input specification and the image output specification of the input image are changed; wherein the image input specification comprises at least a resolution and a format of the input image;

performing the step of determining the image processing information for the input image in response to at least one of the image input specification and the image output specification being changed;

calling existing image processing information in response to none of the image input specification and the image output specification being changed;

wherein prior to performing the image processing, in accordance with the image processing information, on the plurality of images in the input image in the parallel and matrix manner, the image processing method further comprises:

determining whether a computing resource for executing the image quality enhancement process is changed, where the computing resource comprises an Neural Network Processing Unit (NPU) resource, a Graphics Processing Unit (GPU) resource and a Central Processing Unit (CPU) resource;

in a case where the computing resource is changed and there exist available NPU resources and available GPU resources, taking all the available NPU resources and available GPU resources as candidate computing resources for executing the image quality enhancement process;

in a case where the computing resource is changed and there exist available NPU resources but no available GPU resources, taking all the available NPU resources as candidate computing resources for executing the image quality enhancement process;

in a case where the computing resource is changed and there exist available GPU resources but no available NPU resources, taking a part of the available GPU resources as candidate computing resources for executing the image quality enhancement process;

in a case where the computing resource is changed and there exists no available NPU resources and no available GPU resources, taking a part of available CPU resources as candidate computing resources for executing the image quality enhancement process.

2. The image processing method according to claim 1, wherein the determining the image processing information for the input image comprises:

obtaining a format and a resolution of the input image;

determining a decoder for converting the format of the input image into a first preset format as the first format adjustment information in response to the format of the input image not being the first preset format; and determining a standard resolution which is closest to the resolution of the input image as the resolution adjustment parameter in response to the resolution of the input image not being the standard resolution.

3. The image processing method according to claim 2, wherein the preprocessing process comprises:

converting the format of the input image into the first preset format by using the decoder in response to the format of the input image not being the first preset format;

zooming the resolution of the input image into the standard resolution in response to the resolution of the input image not being the standard resolution.

4. The image processing method according to claim 1, wherein the determining the image processing information for the input image comprises:

determining whether the candidate computing resources comprise NPU resources or GPU resources;

in response to available computing resources comprising at least one of the NPU resources or the GPU resources, taking an image quality level corresponding to an image quality requirement set by a user as an image quality level of the image quality optimization information;

in response to available computing resources not comprising any NPU resources and any GPU resources, determining an image quality level corresponding to an image quality requirement set by the user;

in response to the image quality level being smaller than or equal to a first level threshold, taking the image quality level corresponding to the image quality requirement set by the user as an image quality level of the image quality optimization information;

in response to the image quality level being larger than the first level threshold, taking an image quality level corresponding to the first level threshold as an image quality level corresponding to the image quality optimization information.

5. The image processing method according to claim 4, wherein the determining the image processing information for the input image comprises:

selecting a first model group, wherein the first model group comprises a plurality of image processing models, each image processing model in the first model group is capable of processing an image whose resolution is an image resolution corresponding to the resolution adjustment parameter;

selecting a second model group from the first model group, wherein an image quality level corresponding to image processing models in the second model group is the image quality level of the image quality optimization information;

in response to the second model group comprising an image processing model whose output resolution is equal to the image output resolution, taking the image processing model whose output resolution is equal to the image output resolution as a target image processing model corresponding to the image quality optimization information;

in response to the second model group not comprising any image processing model whose output resolution is equal to the image output resolution, taking an image processing model having a highest output resolution in the second model group as a target image processing model corresponding to the image quality optimization information.

6. The image processing method according to claim 5, wherein the image quality enhancement process comprises: performing image quality enhancement on the input image by using the target image processing model.

7. The image processing method according to claim 5, wherein the determining the image processing information for the input image comprises:

in response to the output resolution of the target image processing model being equal to the image output resolution, determining a same-resolution sharpening process as the resolution optimization information, wherein a resolution corresponding to the same-resolution sharpening process is identical to the image output resolution;

in response to the output resolution of the target image processing model being smaller than the image output resolution, determining an up-sampling process as the resolution optimization information, wherein a resolution of an up-sampled image is identical to the image output resolution;

in response to the image output format being different from a first preset format, determining an encoder for converting a format of the input image from the first preset format to the image output format as the second format adjustment information.

8. The image processing method according to claim 7, wherein the post-processing process comprises:

in response to the output resolution of the target image processing model being equal to the image output resolution, performing the same-resolution sharpening process on the input image;

in response to the output resolution of the target image processing model being smaller than the image output resolution, performing the up-sampling process on the input image, wherein the resolution of the up-sampled image is identical to the image output resolution;

in response to the image output format being different from the first preset format, encoding the format of the input image into the image output format by using the encoder.

9. A display apparatus, comprising a memory, a processor and a computer program stored in the memory and capable of being executed by the processor, wherein the computer program is executed by the processor to implement:

acquiring an input image and an image output specification, wherein the image output specification comprises an image output quality, an image output resolution and an image output format;

determining image processing information for the input image, wherein the image processing information comprises first format adjustment information and a resolution adjustment parameter which are determined in accordance with the input image, image quality optimization information determined in accordance with the input image and the image output specification, and second format adjustment information and resolution optimization information which are determined in accordance with the image output specification;

performing image processing, in accordance with the image processing information, on a plurality of images in the input image in a parallel and matrix manner, and outputting processed images according to an arrangement order of the plurality of images, wherein the performing image processing on the plurality of images in the parallel and matrix manner is referred to as performing processing on the plurality of images in parallel, and processes performed on each image comprise a preprocessing process, an image quality enhancement process and a post-processing process, wherein the preprocessing process is performed in accordance with the first format adjustment information and the resolution adjustment parameter, the image quality enhancement process is performed in accordance with the image quality optimization information, and the post-processing process is performed in accordance with the second format adjustment information and the resolution optimization information;

wherein the computer program is further executed by the processor to implement:

subsequent to acquiring the input image and the image output specification, determining whether an image input specification and the image output specification of the input image are changed, wherein the image input specification comprises at least a resolution and a format of the input image;

performing the step of determining the image processing information for the input image in response to at least one of the image input specification and the image output specification being changed;

calling existing image processing information in response to none of the image input specification and the image output specification being changed;

wherein the computer program is further executed by the processor to implement:

prior to performing the image processing, in accordance with the image processing information, on the plurality of images in the input image in the parallel and matrix manner, determining whether a computing resource for executing the image quality enhancement process is changed, where the computing resource comprises a Neural Network Processing Unit (NPU) resource, a Graphics Processing Unit (GPU) resource and a Central Processing Unit (CPU) resource;

in a case where the computing resource is changed and there exist available NPU resources and available GPU resources, taking all the available NPU resources and available GPU resources as candidate computing resources for executing the image quality enhancement process;

in a case where the computing resource is changed and there exist available NPU resources but no available GPU resources, taking all the available NPU resources as candidate computing resources for executing the image quality enhancement process;

in a case where the computing resource is changed and there exist available GPU resources but no available NPU resources, taking a part of the available GPU resources as candidate computing resources for executing the image quality enhancement process;

in a case where the computing resource is changed and there exists no available NPU resources and no available GPU resources, taking a part of available CPU resources as candidate computing resources for executing the image quality enhancement process.

10. The display apparatus according to claim 9, wherein the computer program is further executed by the processor to implement:
   obtaining a format and a resolution of the input image;
   determining a decoder for converting the format of the input image into a first preset format as the first format adjustment information in response to the format of the input image not being the first preset format; and
   determining a standard resolution which is closest to the resolution of the input image as the resolution adjustment parameter in response to the resolution of the input image not being the standard resolution.

11. The display apparatus according to claim 10, wherein the preprocessing process comprises:
   converting the format of the input image into the first preset format by using the decoder in response to the format of the input image not being the first preset format;
   zooming the resolution of the input image into the standard resolution in response to the resolution of the input image not being the standard resolution.

12. The display apparatus according to claim 9, wherein the computer program is further executed by the processor to implement:
   determining whether the candidate computing resources comprise NPU resources or GPU resources;
   in response to available computing resources comprising at least one of the NPU resources or the GPU resources, taking an image quality level corresponding to an image quality requirement set by a user as an image quality level of the image quality optimization information;
   in response to available computing resources not comprising any NPU resources and any GPU resources, determining an image quality level corresponding to an image quality requirement set by the user;
   in response to the image quality level being smaller than or equal to a first level threshold, taking the image quality level corresponding to the image quality requirement set by the user as an image quality level of the image quality optimization information;
   in response to the image quality level being larger than the first level threshold, taking an image quality level corresponding to the first level threshold as an image quality level corresponding to the image quality optimization information.

13. The display apparatus according to claim 12, wherein the computer program is further executed by the processor to implement:
   selecting a first model group, wherein the first model group comprises a plurality of image processing models, each image processing model in the first model group is capable of processing an image whose resolution is an image resolution corresponding to the resolution adjustment parameter;
   selecting a second model group from the first model group, wherein an image quality level corresponding to image processing models in the second model group is the image quality level of the image quality optimization information;
   in response to the second model group comprising an image processing model whose output resolution is equal to the image output resolution, taking the image processing model whose output resolution is equal to the image output resolution as a target image processing model corresponding to the image quality optimization information;
   in response to the second model group not comprising any image processing model whose output resolution is equal to the image output resolution, taking an image processing model having a highest output resolution in the second model group as a target image processing model corresponding to the image quality optimization information.

14. The display apparatus according to claim 13, wherein the image quality enhancement process comprises: performing image quality enhancement on the input image by using the target image processing model.

15. The display apparatus according to claim 13, wherein the computer program is further executed by the processor to implement:
   in response to the output resolution of the target image processing model being equal to the image output resolution, determining a same-resolution sharpening process as the resolution optimization information, wherein a resolution corresponding to the same-resolution sharpening process is identical to the image output resolution;
   in response to the output resolution of the target image processing model being smaller than the image output resolution, determining an up-sampling process as the resolution optimization information, wherein a resolution of an up-sampled image is identical to the image output resolution;
   in response to the image output format being different from a first preset format, determining an encoder for converting a format of the input image from the first preset format to the image output format as the second format adjustment information.

16. A non-transitory computer-readable storage medium having a computer program stored thereon, wherein the non-transitory computer program is executed by a processor to implement:
   acquiring an input image and an image output specification, wherein the image output specification comprises an image output quality, an image output resolution and an image output format;
   determining image processing information for the input image, wherein the image processing information comprises first format adjustment information and a resolution adjustment parameter which are determined in accordance with the input image, image quality optimization information determined in accordance with the input image and the image output specification, and second format adjustment information and resolution optimization information which are determined in accordance with the image output specification;
   performing image processing, in accordance with the image processing information, on a plurality of images in the input image in a parallel and matrix manner, and outputting processed images according to an arrangement order of the plurality of images, wherein the performing image processing on the plurality of images in the parallel and matrix manner is referred to as performing processing on the plurality of images in parallel, and processes performed on each image comprise a preprocessing process, an image quality enhancement process and a post-processing process, wherein the preprocessing process is performed in accordance with the first format adjustment information and the resolution adjustment parameter, the image quality enhancement process is performed in accordance with the image quality optimization information, and the post-processing process is performed in accordance with the second format adjustment information and the resolution optimization information;

wherein the computer program is further executed by the processor to implement:

subsequent to acquiring the input image and the image output specification, determining whether an image input specification and the image output specification of the input image are changed, wherein the image input specification comprises at least a resolution and a format of the input image;

performing the step of determining the image processing information for the input image in response to at least one of the image input specification and the image output specification being changed;

calling existing image processing information in response to none of the image input specification and the image output specification being changed;

wherein the computer program is further executed by the processor to implement:

prior to performing the image processing, in accordance with the image processing information, on the plurality of images in the input image in the parallel and matrix manner, determining whether a computing resource for executing the image quality enhancement process is changed, where the computing resource comprises an Neural Network Processing Unit (NPU) resource, a Graphics Processing Unit (GPU) resource and a Central Processing Unit (CPU) resource;

in a case where the computing resource is changed and there exist available NPU resources and available GPU resources, taking all the available NPU resources and available GPU resources as candidate computing resources for executing the image quality enhancement process;

in a case where the computing resource is changed and there exist available NPU resources but no available GPU resources, taking all the available NPU resources as candidate computing resources for executing the image quality enhancement process;

in a case where the computing resource is changed and there exist available GPU resources but no available NPU resources, taking a part of the available GPU resources as candidate computing resources for executing the image quality enhancement process;

in a case where the computing resource is changed and there exists no available NPU resources and no available GPU resources, taking a part of available CPU resources as candidate computing resources for executing the image quality enhancement process.

17. The non-transitory computer-readable storage medium according to claim 16, wherein the computer program is further executed by the processor to implement:

determining whether the candidate computing resources comprise NPU resources or GPU resources;

in response to available computing resources comprising at least one of the NPU resources or the GPU resources, taking an image quality level corresponding to an image quality requirement set by a user as an image quality level of the image quality optimization information;

in response to available computing resources not comprising any NPU resources and any GPU resources, determining an image quality level corresponding to an image quality requirement set by the user;

in response to the image quality level being smaller than or equal to a first level threshold, taking the image quality level corresponding to the image quality requirement set by the user as an image quality level of the image quality optimization information;

in response to the image quality level being larger than the first level threshold, taking an image quality level corresponding to the first level threshold as an image quality level corresponding to the image quality optimization information.

18. The non-transitory computer-readable storage medium according to claim 17, wherein the computer program is further executed by the processor to implement:

selecting a first model group, wherein the first model group comprises a plurality of image processing models, each image processing model in the first model group is capable of processing an image whose resolution is an image resolution corresponding to the resolution adjustment parameter;

selecting a second model group from the first model group, wherein an image quality level corresponding to image processing models in the second model group is the image quality level of the image quality optimization information;

in response to the second model group comprising an image processing model whose output resolution is equal to the image output resolution, taking the image processing model whose output resolution is equal to the image output resolution as a target image processing model corresponding to the image quality optimization information;

in response to the second model group not comprising any image processing model whose output resolution is equal to the image output resolution, taking an image processing model having a highest output resolution in the second model group as a target image processing model corresponding to the image quality optimization information.

19. The non-transitory computer-readable storage medium according to claim 18, wherein the image quality enhancement process comprises: performing image quality enhancement on the input image by using the target image processing model.

20. The non-transitory computer-readable storage medium according to claim 18, wherein the computer program is further executed by the processor to implement:

in response to the output resolution of the target image processing model being equal to the image output resolution, determining a same-resolution sharpening process as the resolution optimization information, wherein a resolution corresponding to the same-resolution sharpening process is identical to the image output resolution;

in response to the output resolution of the target image processing model being smaller than the image output resolution, determining an up-sampling process as the resolution optimization information, wherein a resolution of an up-sampled image is identical to the image output resolution;

in response to the image output format being different from a first preset format, determining an encoder for converting a format of the input image from the first preset format to the image output format as the second format adjustment information.

* * * * *